UNITED STATES PATENT OFFICE.

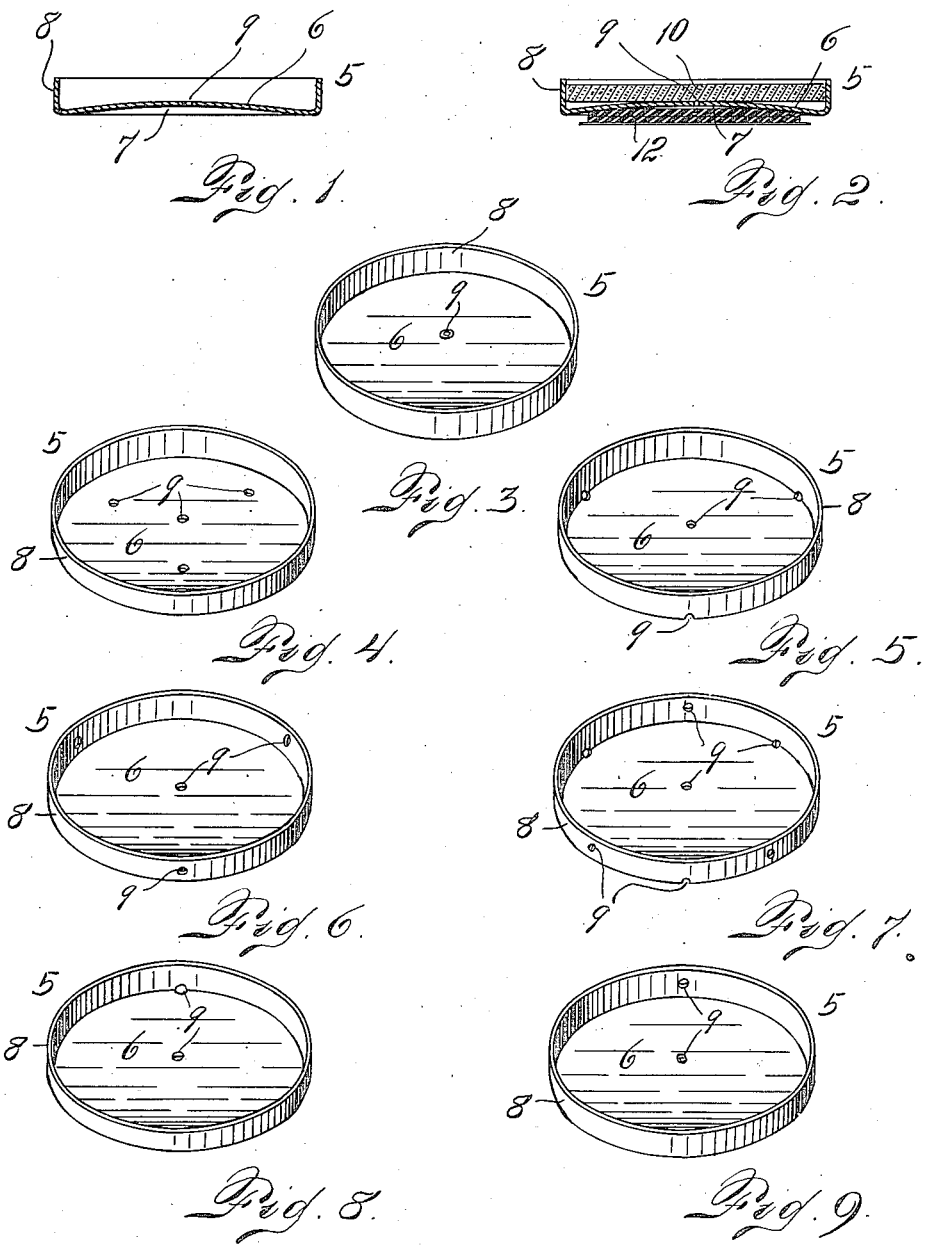

ARTHUR B. LOW, OF DENVER, COLORADO.

VENTILATED VULCANIZING-PAN.

1,265,462.  Specification of Letters Patent.  Patented May 7, 1918.

Application filed April 27, 1916. Serial No. 93,894.

*To all whom it may concern:*

Be it known that I, ARTHUR B. LOW, a citizen of the United States, residing at the city and county of Denver and State of Colorado, have invented certain new and useful Improvements in Ventilated Vulcanizing-Pans; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to an improvement in pans or receptacles adapted to hold a heat-generating or heat-producing substance in solid or semi-solid or cake form, my object being to provide a receptacle more especially adapted for use in holding the fuel employed for producing the heat for performing the necessary vulcanizing act in applying patches to the inner tubes of pneumatic tires or similar articles. My improved pan is adapted to hold just the amount of fuel required to perform a single vulcanizing act. The character of fuel which I employ may consist of pasteboard or other similar or suitable porous or absorbent substance, the same being saturated with a more or less rapidly burning but non-flaming composition. In burning fuel of the last named character, it is important to make provision for ventilating the fuel holder, in order that the parts thereof in direct contact with the bottom and sides of the pan may be brought into contact with the necessary oxygen for supporting and maintaining combustion.

Furthermore, pans of this character should have their bottoms provided with a slight exterior concavity in order that the edges of the patch when vulcanized in place, may taper or curve downwardly and merge into the surrounding surface of the tire or other similar article to which the patch is applied. For this reason, when the patch or the gum or rubber or other vulcanizing material which is to form the patch, is applied to the bottom of the pan, or when the pan is applied to the patch, there is a tendency to form an air pocket, since the engaging surface of the patch is horizontal or flat while the adjacent surface of the pan is concave. If this air pocket condition is maintained, proper vulcanizing results will not be obtained, since the layer of air between the bottom of the pan and the patch, insulates the patch to a certain extent from the heat and has a tendency to retard vulcanization and also to make the vulcanizing act non-uniform in character. Furthermore, it is desirable in applying patches of this character that the name of the manufacturer of the device and also the patent date, if the article employed is patentable, shall appear on the patch. I have found by actual demonstration that where the air pocket is maintained as aforesaid, that this data is not properly brought out, thus indicating that the vulcanizing act has not been properly performed. In order to overcome this difficulty, I provide the bottom of the pan or receptacle for the heat-generating substance with one or more perforations, one of these perforations being preferably formed in the center of the pan's bottom. Then, when the bottom of the pan is applied to the patch and the patch to the perforated or punctured tire, the air will readily escape, and the gum or rubber will completely fill the exterior concavity in the bottom of the pan, whereby the metal of the bottom is brought in direct contact with the vulcanizable material, in which event the conditions are ideal or at least well suited for producing excellent results.

Having briefly outlined the invention, I will proceed to describe the same in detail, reference being made to the accompanying drawing, in which is illustrated an embodiment thereof. In this drawing,—

Figure 1 is a central vertical section taken through a fuel-holding pan equipped with my improvement.

Fig. 2 is a similar view showing the pan with the fuel in place and the patch applied, ready for the performance of the vulcanizing act.

Figs. 3 to 9 inclusive are perspective views showing the ventilated pan with the perforations arranged in different locations and also showing different numbers of perforations.

The same reference characters indicate the same parts in all the views.

Let the numeral 5 designate the pan or receptacle considered in its entirety, and having a bottom 6 formed slightly exteriorly concave as shown at 7, the pan having an upwardly projecting circumferential rim 8. In the center of this pan I may form a single perforation 9, which will serve for the escape of the air, which otherwise would be trapped in the shallow pocket 10 which is formed adjacent the bottom of the pan when the patch 12 is applied thereto. In addition to the central perforation 9 other additional perforations may be formed in the bottom of the pan as shown in Fig. 4; at the corner of the pan as shown in Fig. 5; in the rim of the pan as shown in Fig. 6; in both the rim and at the corner as shown in Fig. 7. In Fig. 8 I have shown a single perforation in the center of the bottom of the pan and a single perforation at the corner; while in Fig. 9 I have shown a single perforation in the center of the bottom and a perforation in the rim slightly above the bottom.

From the foregoing description it will be understood that my improved construction of pan, is adapted to perform the function of preventing the pocketing of the air between the bottom of the pan and the patch, and also that this construction will serve to ventilate the pan sufficiently for purposes of combustion.

Furthermore, when the unvulcanized rubber is calendered or formed into sheets from which the patches are cut, with which my improvement is employed, it sometimes happens that the surface of the patches have a considerable roughness or an uneven condition characterized by small recesses in which air may be pocketed when placed against even a flat surface. Hence, this is another reason for employing a perforation or perforations in the bottom of the pan, namely, to allow any air to escape that otherwise might be confined in the recesses or unevennesses of the gum or rubber employed in performing the vulvanizing function for tire repair or patching purposes.

Having thus described my invention, what I claim is,—

1. A vulcanizer comprising a pan having a wall projecting upwardly from the outer edge of its bottom and containing fuel in solid form, said fuel directly engaging the inner surface of the bottom of the pan and in close proximity to the outer wall of the pan, the outer surface of the pan bottom being equipped with a layer of vulcanizable material, the pan being perforated to allow direct entrance of air to the fuel chamber.

2. The combination of a vulcanizing pan whose bottom is provided with an exterior concavity, a quantity of fuel in solid form located in the pan, and a patch adapted to engage the exterior surface of the bottom of the pan during the vulcanizing act, the pan bottom being perforated to prevent the pocketing of air between the bottom of the pan and the patch.

3. The herein described vulcanizing means comprising a pan whose bottom has a shallow exterior concavity, a layer of combustible material in solid form in the pan, and a layer of vulcanizable material which the bottom of the pan engages during the vulcanizing act, the pan bottom being perforated to prevent the pocketing of air between the vulcanizable layer and the pan bottom.

4. The vulcanizing means herein described, comprising a pan, a layer of combustible material, and a layer of vulcanizable material, the two layers being arranged on opposite sides of the pan, said pan perforated near its bottom to permit air to enter near the bottom of the fuel.

In testimony whereof I affix my signature, in presence of two witnesses.

ARTHUR B. LOW.

Witnesses:
 GRACE HUSTON,
 A. J. O'BRIEN.